United States Patent
Imai et al.

[11] Patent Number: 5,978,590
[45] Date of Patent: *Nov. 2, 1999

[54] INSTALLATION SYSTEM

[75] Inventors: Tsuneo Imai, Ueda; Yoshifumi Mitani; Kiyoharu Komatsu, both of Shiojiri, all of Japan

[73] Assignees: Epson Kowa Corporation; Epson Direct Corporation, both of Nagano, Japan

[*] Notice: This patent is subject to a terminal disclaimer.

[21] Appl. No.: 08/976,991

[22] Filed: Nov. 24, 1997

Related U.S. Application Data

[63] Continuation of application No. 08/528,087, Sep. 14, 1995, Pat. No. 5,717,930.

[30] Foreign Application Priority Data

Sep. 19, 1994 [JP] Japan .................................. 6-223108

[51] Int. Cl.[6] .................................................... G06F 9/445
[52] U.S. Cl. ........................ 395/712; 395/706; 395/707; 395/708; 395/709; 395/710; 395/712
[58] Field of Search ..................................... 395/710, 712

[56] References Cited

U.S. PATENT DOCUMENTS

| | | |
|---|---|---|
| 4,780,821 | 10/1988 | Crossley . |
| 5,142,680 | 8/1992 | Ottman et al. . |
| 5,247,683 | 9/1993 | Holmes et al. . |
| 5,367,686 | 11/1994 | Fisher et al. . |
| 5,421,009 | 5/1995 | Platt . |
| 5,495,607 | 2/1996 | Pisello et al. .............................. 707/10 |
| 5,555,416 | 9/1996 | Owens et al. . |
| 5,717,930 | 2/1998 | Imai et al. ............................... 395/712 |
| 5,727,205 | 3/1998 | Bell et al. ................................ 707/200 |
| 5,742,829 | 4/1998 | Davis et al. ............................. 395/712 |
| 5,793,979 | 8/1998 | Lichtman et al. .................. 395/200.56 |
| 5,842,024 | 11/1998 | Choye et al. ............................ 395/712 |

Primary Examiner—Tariq R. Hafiz
Assistant Examiner—Ted T. Vo
Attorney, Agent, or Firm—Mark P. Watson

[57] ABSTRACT

The present invention provides an installation system that facilitates the operation on computer terminals in the network system and allows for automatic installation of an operating system software program on computer terminals. A PC to be shipped is connected to a network. After the PC is switched on, an installation floppy disk is inserted in the drive and started up. The installation start-up program stored in the floppy disk is copied to the internal memory of the PC. After the PC is connected to an installation server, the hard disk drive is initialized. The bar coded ID of the PC is read with a bar code reader. The installation information relevant to that ID is retrieved from the installation server by using the ID as a key. Based on the installation information retrieved, the software information stored in the storage device of installation server is read to obtain the operating system software program and the pertinent information for setting up the environment, and then the operating system software is installed. In the next step, application software programs are also installed.

4 Claims, 6 Drawing Sheets

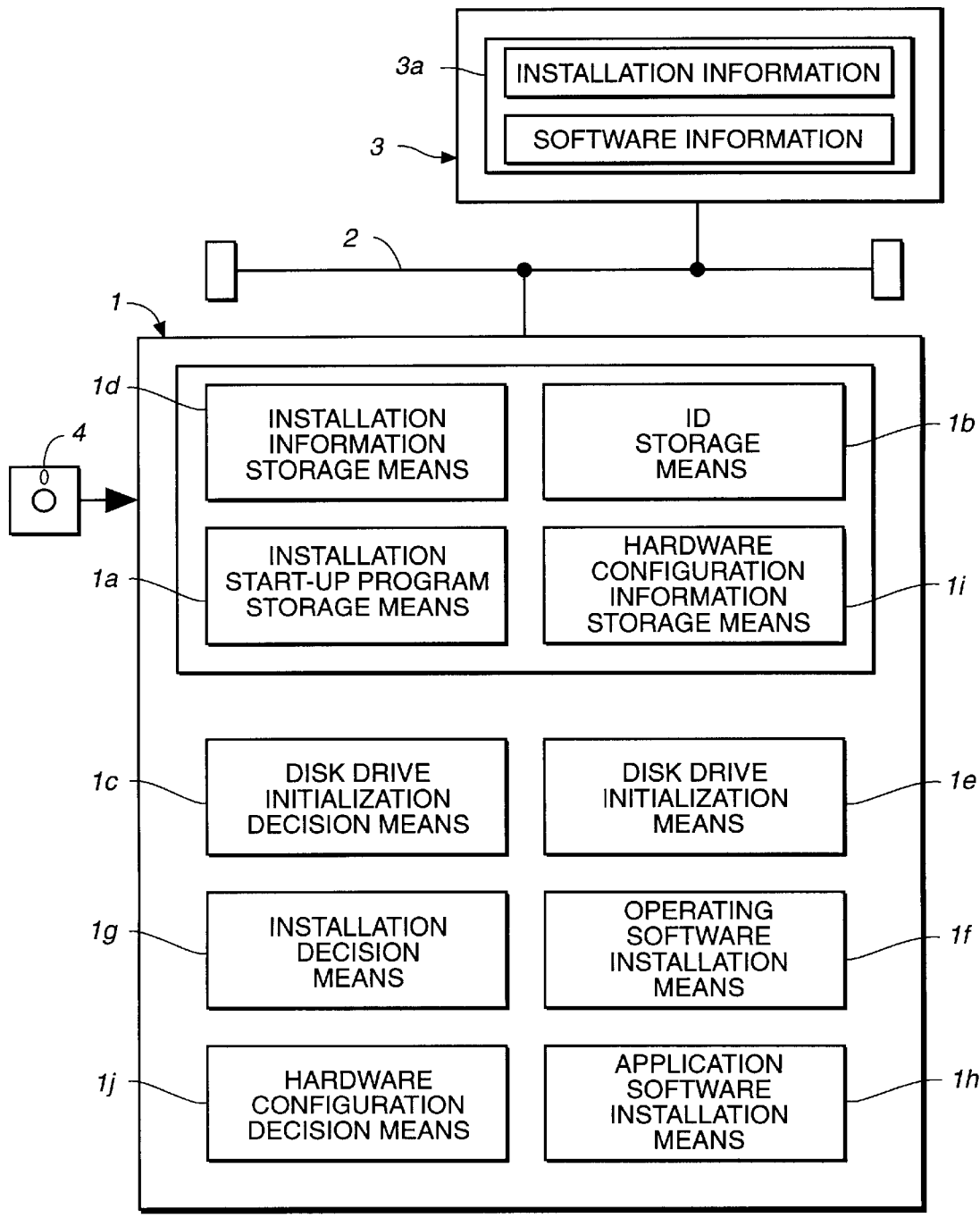
FIG._1

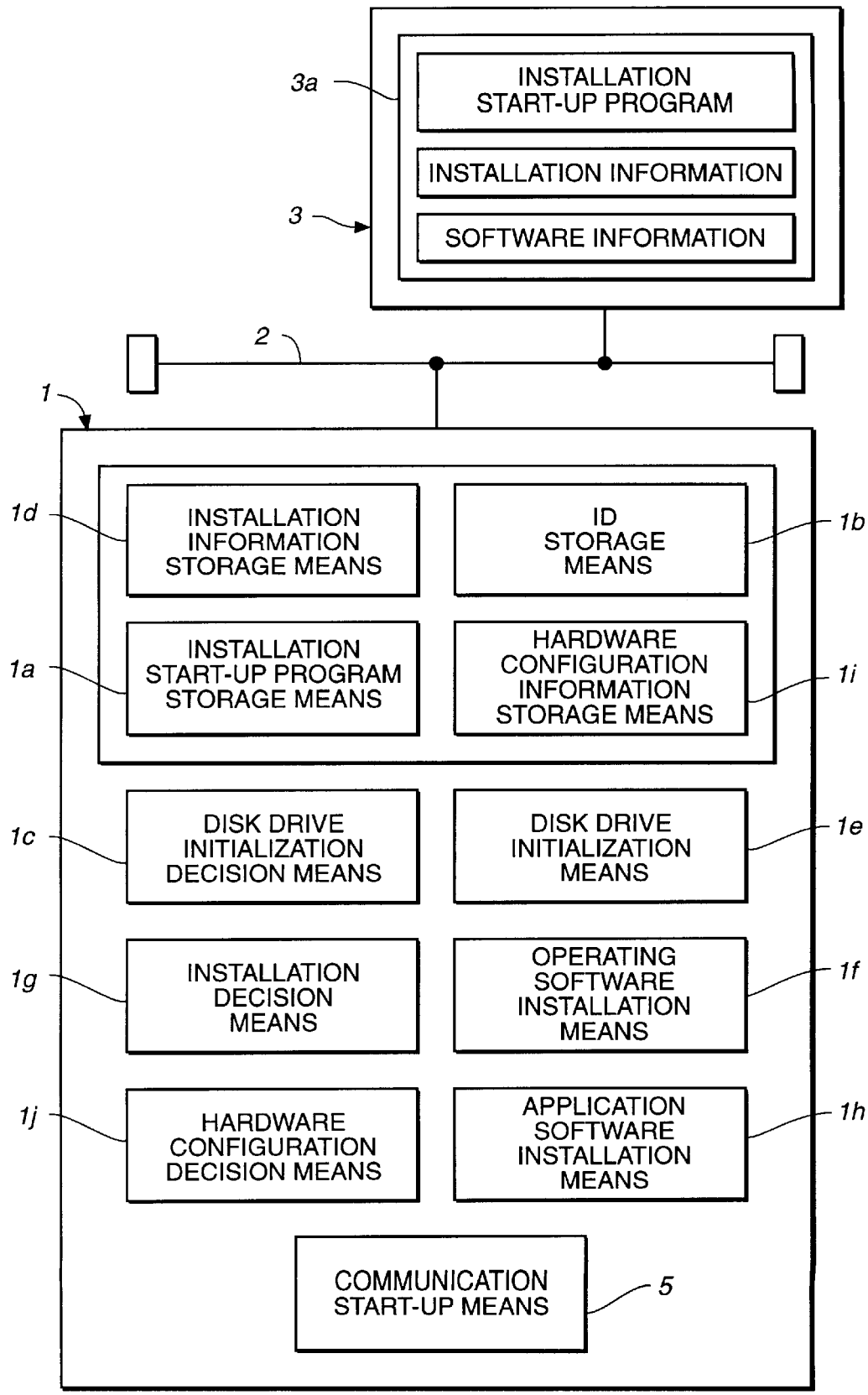
FIG._2

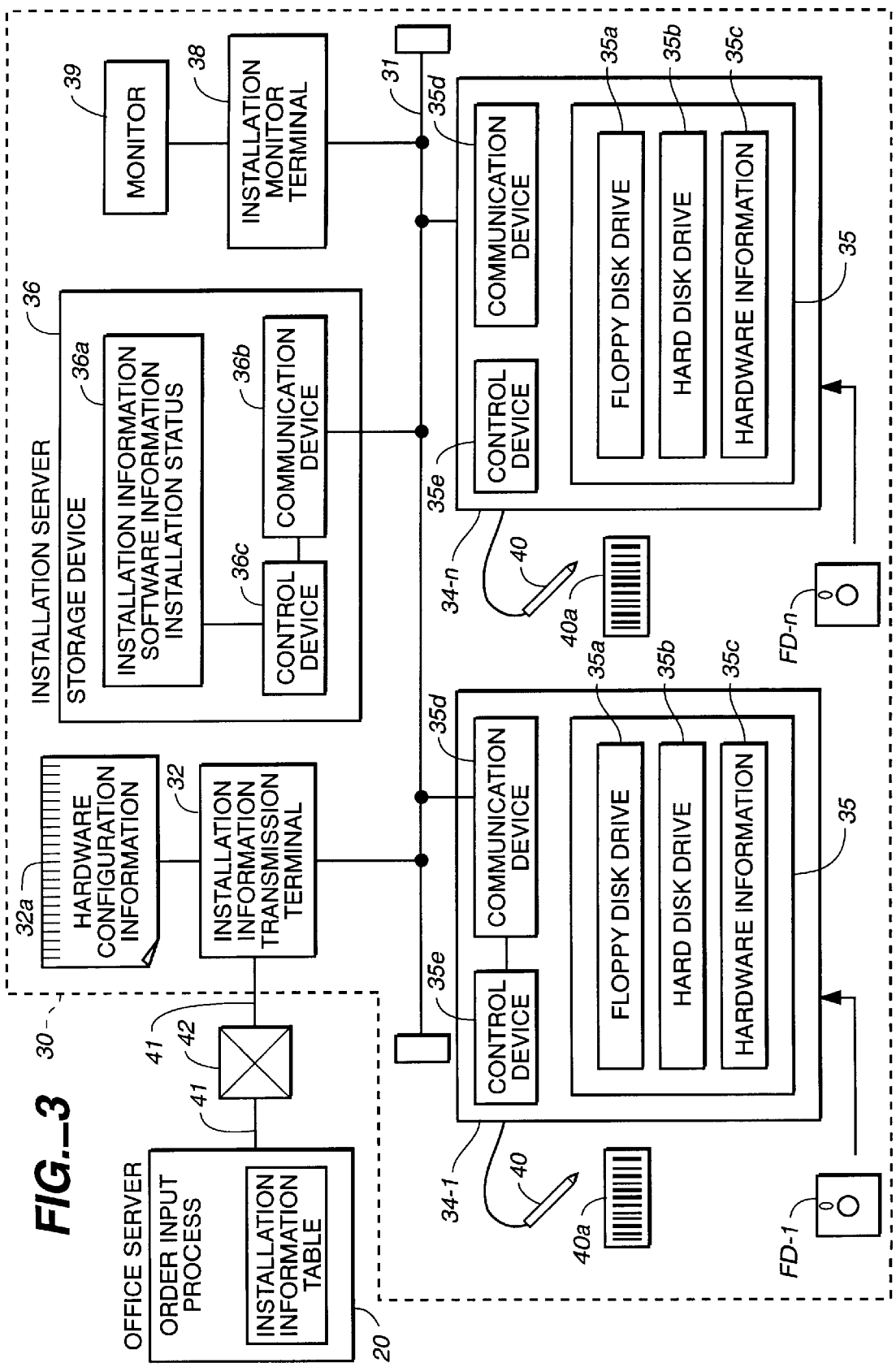
FIG._3

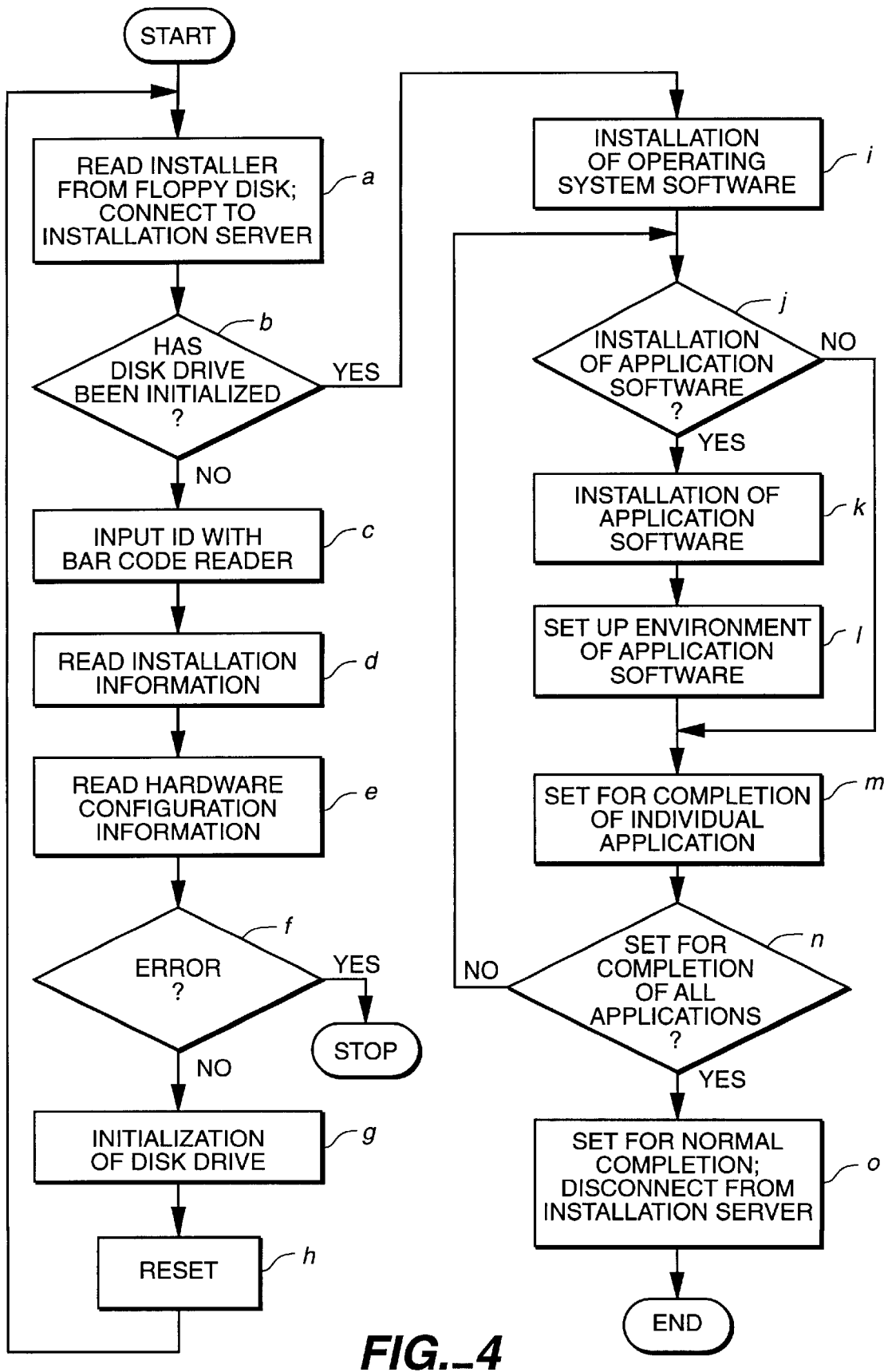
FIG._4

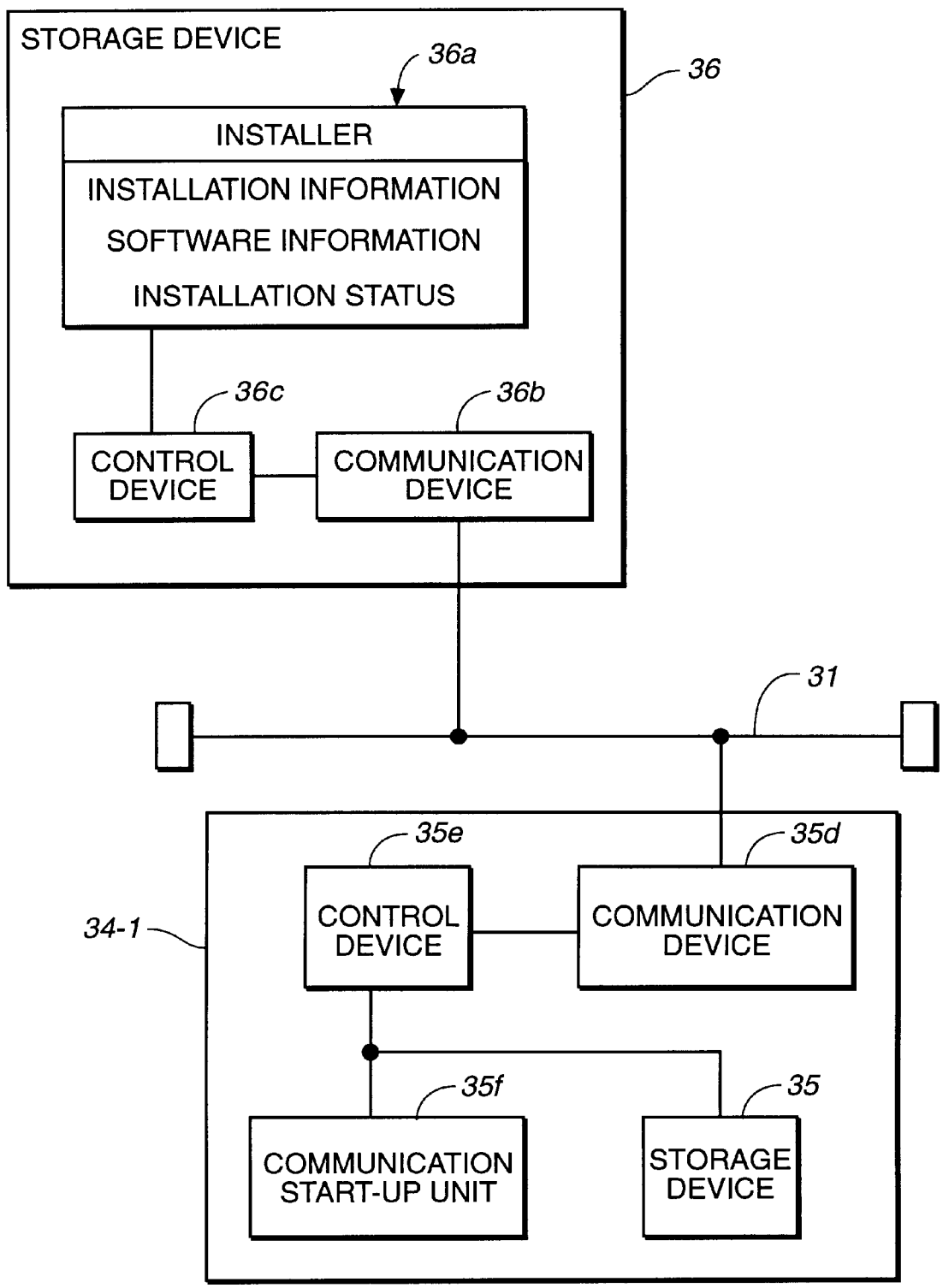
FIG._5

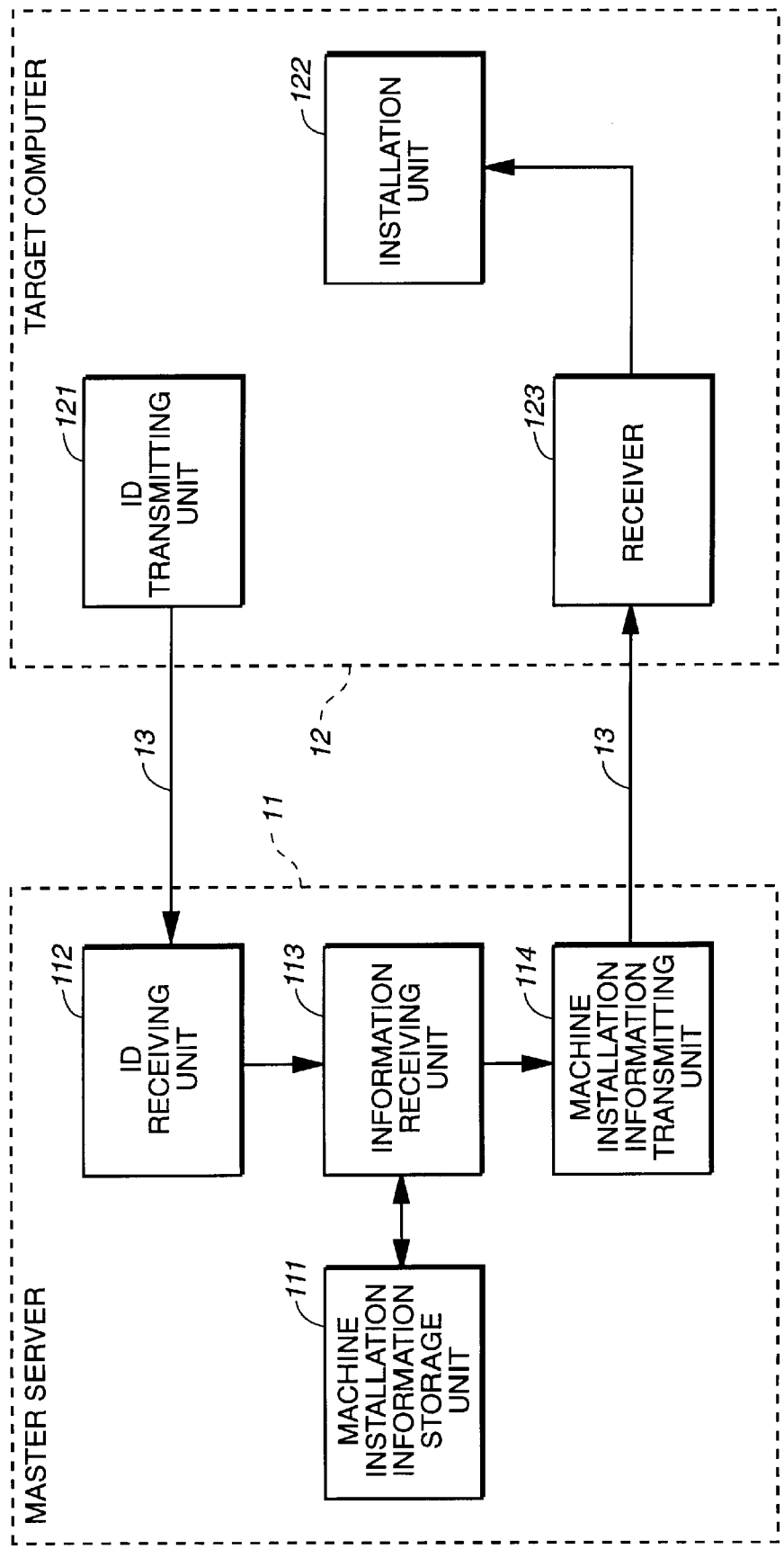
FIG._6

INSTALLATION SYSTEM

This is a Continuation of prior application Ser. No. 08/528,087 filed on Sep. 14, 1995 now U.S. Pat. No. 5,717,930 which is incorporated herein by reference.

BACKGROUND OF THE INVENTION

1. Field of the invention

The present invention relates generally to a network system of personal computers (referred to as PCs hereafter) equipped with hard disk drives and, more particularly, to an installation system of software for each computer terminal.

2. Description of the Related Art

When operating a newly purchased personal computer for the first time or when running a newly bought software package for the first time, one must start up the PC or the software program with a floppy disk of an operating system (OS) or with an application software program by inserting it in the drive. One must also install the program stored in the floppy disk into the hard disk drive and set up the environment. It is customary for end users themselves to install a software program and to set up the environment by using a keyboard and referring to a manual that comes with the new software package. These tasks are time consuming for a beginner as well as an expert.

Oftentimes in PC classes at schools and at PC training centers, software installation and/or hardware initialization must be done for many computers. Teachers and instructors expend a lot of time and efforts to do so.

It has been a trend of recent years that, when a user purchases a new PC, the user specifies the configuration of the PC to be purchased such as a CPU and a capacity of a hard disk drive. The user is also asked to purchase an OS and at least a few application software packages to prevent any copyright infringement. The fact that a basic set of software packages to run the new PC come with it indicates that selling a PC means "providing functions" rather than "providing just hardware." When manufacturers of PCs sell their products, they do not just bundle the PC and the application software packages a buyer specifies, but they must provide PCs that have application software programs already installed. It requires much time and labor to install different software programs on individual PCs according to the selections made by individual buyers. Further, it takes a long time to make copies of software programs. Therefore, shipping delays may occur.

The installation system presented in the Japanese patent laid-open publication HEI 6-44055 discloses a technique to eliminate the complexity of the software installation described above. As shown in FIG. 6, the installation system comprises a master server (computer) 11 that provides information regarding the installation through a network 13 in response to a request, and a target computer 12 that receives information regarding the installation from master server 11 through network 13 and performs the installation. Master server 11 comprises a machine installation information storage unit 111 that stores the machine information corresponding to computer IDs and the installation information, an ID receiving unit 112 that receives IDs from an ID transmitting unit 121 of target computer 11, an information retrieving unit 113 that retrieves information from machine installation information storage unit 111 using the received ID as a key, and a machine installation information transmitting unit 114 that transmits the retrieved information to target computer 12. Target computer 12 comprises ID transmitting unit 121 that transmits its own ID to master server 11 to obtain the installation information, a receiver 123 that receives the machine and installation information sent from master server 11, and an installation unit 122 that performs the installation based on the received information. Inquiry about the installation information is performed by target computer 12 that sends its ID to master server 11 through ID transmitting unit 121.

ID receiving unit 112 of master server 11 receives a computer ID and passes it to information retrieving unit 113, which in turn searches the ID in the machine installation information table of machine installation information storage unit 111. When that particular computer ID is found, the relevant machine installation information is sent to target computer 12 through machine installation information transmitting unit 114. Installation unit 122 of target computer 12 receives the machine and installation information via receiving unit 123 and performs the installation according to the received information to build a complete system.

The installation system disclosed in the Japanese patent laid-open publication HEI 6-44055 mentioned above has a network of a plurality of computer terminals such as target computer 12, in which the machine and installation information stored in master server 11 (e.g., computer names, computer addresses, network information, purpose of external storage devices, information about the software to be installed) is distributed to the individual terminals. Installation unit 122 obtains the information needed for the installation from master computer 11 and installs the software according to specific installation information. Therefore, users can build a system efficiently without any special knowledge of installation and without any complicated operations.

The computer terminals used in the above network are assumed to have an OS (operating system) already installed. Therefore, a newly purchased computer without an OS installed in it cannot perform an installation operation even when the power is switched on because it is unable to send its computer ID. In other words, the installation system cannot be used to install an OS because a terminal computer does not have an OS installed. Therefore, this installation system still requires manual installation of an OS. Accordingly, it is not suitable for such applications as installation for a computer class at schools and installation at a manufacturer's site to produce installed computers.

SUMMARY OF THE INVENTION

The method of the present invention to overcome the problem described above is characterized by copying an installation start-up program to a computer terminal, determining whether or not the hard disk drive should be initialized, and initializing it, if necessary, followed by installation of the operating system software.

An object of the present invention is, therefore, to present an installation system that automatically installs an operating system in a computer terminal on its network with a simplified manual operation on the computer terminal.

According to a first embodiment of the invention, an installation system comprises an installation server, a plurality of computer terminals, and a network connected between the installation server and the computer terminals.

According to a first aspect of the first embodiment, the installation server comprises a storage means for storing installation information and software information. The installation information includes IDs of the computer terminals, and the software information includes operating system software, a plurality of application software programs, and information for setting up an environment.

According to second aspect of the first embodiment of the invention, each computer terminal includes a hard disk drive, and an installation start-up program storage means for storing installation start-up program that is copied from a portable information recording medium when the computer terminal is switched on;

According to a third aspect of the first embodiment of the invention, each computer terminal also includes an ID storage means for storing the IDs of the computer terminal, and a hard disk drive initialization decision means that determines whether initialization of said hard disk drive is necessary.

According to a fourth aspect of the first embodiment of the invention, each computer terminal further includes an installation information storage means. If initialization of the hard disk drive is necessary, the installation information storage means retrieves from the installation server the installation information corresponding to the computer terminal using its ID as a key, and stores it therein.

According to a fifth aspect of the first embodiment of the invention, each computer terminal further includes a disk drive initialization means for initializing the hard disk drive after the installation information is retrieved from the installation server, and operating system software installation means. If initialization of the hard disk drive is not necessary, the operating system software installs the operating system software based on the installation information after retrieving the operating system software from the installation server.

According to a sixth aspect of the first embodiment of the invention, each computer terminal additionally includes an installation decision means for determining, in sequence, whether each of the application software programs should be installed based on the installation information, and an application software installation means. If an application software program needs to be installed, the application software installation means installs the application software program based on the installation information after retrieving the application software program from the installation server.

According to the second embodiment of the invention an installation system comprises an installation server, a plurality of computer terminals, and a network connected between the installation server and the computer terminals.

According to a first aspect of the second embodiment of the invention, the installation server includes a storage means for storing an installation start-up program, installation information and software information. The installation information includes IDs of the computer terminal. The software information includes operating system software a plurality of application software programs, and information for setting up an environment.

According to a second aspect of the second embodiment of the invention, each computer terminal includes a hard disk drive, a communication start-up means for storing at least a communication start-up program of the operating system software. When the computer terminal is switched on, the communication start-up means retrieves the installation start-up program from the installation server.

According to a third aspect of the second embodiment of the invention the computer terminal also includes an installation start-up program storage means for storing the installation start-up program that is copied from the installation server, a ID storage means for storing the IDs of the computer terminal, and a hard disk drive initialization decision means for determining whether initialization of the hard disk drive is necessary.

According to a fourth aspect of the second embodiment of the invention, the computer terminal further includes an installation information storage means. If initialization of the hard disk drive is necessary, the installation information storage means retrieves from the installation server the installation information corresponding to the computer terminal using its ID as a key, and stores it therein.

According to a fifth aspect of the second embodiment of the invention, each computer terminal further includes a disk drive initialization means for initializing the hard disk drive after the installation information is retrieved from the installation server, and an operating system software installation means. If initialization of the hard disk drive is not necessary, the operating system software installs the operating system software based on the installation information after retrieving the operating system software from the installation server.

According to a sixth aspect of the second embodiment of the invention, each computer terminal additionally includes installation decision means for determining, in sequence, whether each of the application software programs should be installed based on the installation information, and an application software installation means. If an application software program needs to be installed, the application software installation means installs the application software program based on the installation information after retrieving the application software program from the installation server.

As described above, the present invention includes an installation means for installing application software programs, a disk drive initialization decision means for determining whether a disk drive has been initialized, a disk drive initialization means for initializing a disk drive, and an installation means for installing an operating system software program. Therefore, the following advantaged are obtained.

Since the automatic installation of an operating system software program is performed by switching on a computer terminal and starting up a portable information recording medium, it is possible to install software programs in PCs according to the various specifications of buyers. This results in facilitation of a complicated shipping operation and a reduction in delivery time. In particular, an operating system program is automatically installed after the hard disk drive is initialized so that manual installations for the operating system program as well as application software programs are not needed. Therefore, the present system is suitable for PC classes at schools and the shipping operations of installed PCs.

Instead of using a portable information recording medium, the present invention can be implemented by storing the installation start-up program in the installation server. In this system, switching on a computer terminal activates a communication start-up means which, in turn, communicates with the installation server to retrieve the installation start-up program and stores it at the installation information storage means of the terminal. This additionally increases efficiency because the start-up operation of a portable information recording medium is not needed.

Furthermore, the system may be configured so that the installation server stores the installation information including the hardware configuration information of computer terminals, while the computer terminal includes a hardware configuration information storage means and a hardware configuration decision means. This system checks the hardware configuration of the computer prior to the initialization of the hard disk drive. Therefore, automatic software installation is prevented on the hard disk drive of a computer that happens to have a wrong hardware configuration, and this improves the shipping control.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a block diagram of the first installation system according to a first embodiment of the present invention.

FIG. 2 is a block diagram of the second installation system according to a second embodiment of the present invention.

FIG. 3 is a block diagram showing the configuration of the installation system which is a part of the PC order receiving and shipping system according to the present invention.

FIG. 4 is a flow chart illustrating the installation operation according to the PC shipping installation system according to the present invention.

FIG. 5 is a block diagram showing the configuration of another PC shipping and installation system according to the present invention.

FIG. 6 shows a block diagram a conventional installation system.

DESCRIPTION OF THE PREFERRED EMBODIMENTS

FIG. 1 shows a functional block diagram of a first installation system of the present invention which includes a computer terminal 1 having a hard disk drive connected to an installation server 3 through a network 2. In this system an installation start-up program is copied by starting-up a portable information medium at the computer terminal. Installation server 3 comprises a storage means 3a for storing a software installation information table that has a field of the IDs of the computer terminals 1 and the software information including an operating system software program, various kinds of application software programs, and the information for setting up the environment. As shown in FIG. 1, computer terminal 1 comprises an installation start-up program storage means 1a, an ID storage means 1b, a hard disk drive initialization decision means 1c, an installation information storage means 1d, a disk drive initialization means 1e, an operating system software installation means 1f, an installation decision means 1g, and an application software installation means 1h. When computer terminal 1 is started up, the installation start-up program stored in a portable information recording medium 4 (a floppy disk, for example) is copied to installation program storage means 1a. ID storage means 1b stores the EDs of the computer terminals. Hard disk drive initialization decision means 1c determines whether initialization of the hard disk drive is necessary. If the initialization is necessary, software installation information storage means 1d retrieves, from installation server 3 through network 2, the software installation information corresponding to that particular computer terminal using the ID as a key and stores that information. After the software installation information is read, disk drive initialization means 1e initializes the hard disk drive. On the other hand, if the initialization is not necessary, operating system software installation means 1f installs the operating system software program according to the installation information after the operating system software is read from installation server 3 through network 2. Installation decision means 1g determines, in sequence, whether each of the application software programs should be installed. If the application software programs need to be installed, application software installation means 1h reads the application software from installation server 3 through network 2 according to the installation information and then installs the application software program.

In a second installation system of the present invention, the installation start-up program is copied from installation server 3 through network 2. FIG. 2 shows a functional block diagram of the second installation system of the present invention. As shown in FIG. 2, installation server 3 comprises a storage means 3a for storing an installation start-up program, a software installation information table that has a field for the IDs of the computer terminals, and the software information, including an operating system software program, various kinds of application software programs, and the information for setting up the environment. Computer terminal 1 comprises a communication start-up means 5, an installation start-up program storage means 1a, an ID storage means 1b, a hard disk drive initialization decision means 1c, an installation information storage means 1d, a disk drive initialization means 1e, an operating system software installation means 1f, an installation decision means 1g, and an application software installation means 1h. Communication start-up means includes a communication start-up program which is part of the operating system software program. In this system, the installation start-up program is copied to an installation start-up program storage means 1a from installation server 3 through network 2. ID storage means 1b stores the IDs of the computer terminals. Hard disk drive initialization decision means 1c determines whether initialization of the hard disk drive is necessary. If the initialization is necessary, installation information storage means 1d retrieves, from installation server 3 through network 2, the installation information corresponding to that particular computer terminal using the ID as a key and stores it. After the installation information is read, a disk drive initialization means 1e initializes the hard disk drive. If the initialization is not necessary, operating system software installation means 1f installs the operating system software program according to the installation information after the operating system software is read from installation server 3. Installation decision means 1g determines, in sequence, whether each application software should be installed. In the case where the application software program needs to be installed, application software installation means 1h reads the application software from installation server 3 according to the software installation information and then installs the application software program.

In order to check the hardware installation of the computer terminals in the first and second installation systems, the following configuration may be employed. Installation server 3 includes storage means 3a for storing the hardware configuration information of the computer terminals as the installation information. Moreover, computer terminal 1 comprises a hardware configuration information storage means 1i for storing the hardware configuration information of the computer terminal and a hardware configuration decision means 1j for determining, prior to the disk drive initialization, if the hardware configuration information read from hardware configuration information storage means 1i agrees with the hardware configuration information read from installation server 3.

To operate the first installation system, one first connects co terminals 1 such as PCs and workstations to network 2, then switches on the power and starts up portable information medium 4 to copy the installation start-up program stored in the medium to installation start-up program storage means 1a. When the copying operation of the program is completed, the installation operation starts.

First, disk drive initialization determination means 1c determines whether the hard disk drive has been initialized. If initialization is required, the installation information associated with that computer terminal is retrieved to software installation information storage means 1d from installation server 3 using the ID stored in ID storage means 1b as a key. Then, disk drive initialization means 1e initializes the hard disk drive. If the hard disk drive has already been initialized, the software information on the operating system is retrieved from installation server 3 according to the installation information. Then, operating system software installation means 1f installs the operating system software program. After this, installation decision means 1g determines, with regard to each application software, whether it should be installed and, if it must be installed, the application software installation means installs the software.

Thus, installation of the operating system software is automatically performed after a computer terminal is switched on and a portable information medium 4 is started by an operator. This allows for automatic custom software installation at the time of shipment, resulting in a decrease in complexity of the shipping operation and, thus, quick delivery. Since the operating system software is automatically installed after the disk drive is initialized, manual installation of the operating system software, as well as application software, is not necessary. Therefore, the present system is suitable for computer classes at schools and for the shipping operations of OS-installed PCs.

The second installation system uses the installation start-up program stored in memory means 3a of installation server 3 instead of the one stored in portable information media 4. Communication start-up means 5 in computer terminal 1 is activated when the power of computer terminal 1 is switched on. The computer terminal, then, starts to communicate with installation server 3 and copies the installation start-up program to software installation information storage means 1d. The operations after this step are the same as those of the first installation system. This system, however, provides more efficiency than the first one because the manual start-up of the portable information medium is not required.

In the system in which memory means 3a of installation server 3 stores installation information includes the hardware configuration information of the computer terminals and computer terminal 1 comprises hardware configuration information storage means 1i and hardware configuration decision means 1j, the hardware configuration of the terminal can be checked before the initialization of the disk drive. Therefore, inadvertent installation on a incorrectly assembled hard disk drive can be avoided. This hardware configuration check just before shipment also improves the quality control of shipping.

FIG. 3 shows a block diagram illustrating the configuration of the installation system of the PC order receiving and shipping system according to the present embodiment. The PC order receiving and shipping system comprises an office server (computer) 20 located at an order receiving site and PC shipping installation system 30 provided in the PC shipping installation process line in a PC manufacturer's plant. A sales person of a PC store or a mail order company inputs the PC hardware configuration and software installation information (e.g., operating system software and various kinds of application software packages) specified by a buyer in office server 20 together with the serial number of the purchased PC that serves as an ID of the record. Office server (computer) 20 and installation system 30 are coupled with each other through telephone line 41 and switchboard 42. In the present embodiment the combination of the hardware configuration information and the software installation information is referred to as the installation information. Office server 20 will have an installation information table as shown in Table 1 according to received orders, which indicates installation information under each of the serial numbers.

TABLE 1

Installation Information Table

| | Hardware Configuration Information | | | | Software Installation Information | | | |
|---|---|---|---|---|---|---|---|---|
| PC ID | CPU | Memory | Disk Drive | Optional Device | Soft. 1 | Soft. 2 | Soft. 3 | Soft. 4 |
| 1234567 | Standard | 10 MB | 340 MB | High Speed | Yes | Yes | No | Yes |
| 1234568 | With FPU | 20 MB | 500 MB | High Speed CRT | Yes | Yes | Yes | Yes |
| 1234569 | Standard | 4 MB | 170 MB | Standard CRT | Yes | Yes | No | No |

The hardware configuration information of the table shows that the PC identified as 1234567, for example, has a standard CPU, an internal RAM memory of 10 MB, an internal hard disk drive of 340 MB, and a high speed CRT as an optional device. The software installation information indicates that the PC needs software 1 (an operating system software such as MSDOS) and application software programs 2 and 4, but not software program 3. Every PC must have the operating system software. The table also shows that the PC 1234568 has a hardware configuration including a CPU with FPU (floating point unit), a 20 MB RAM, a 500 MB hard disk drive, and a high speed CRT as an optional device and needs all the software programs 1, 2, 3, and 4 to be installed. Furthermore, the table shows that the PC 1234569 has a hardware configuration of a standard CPU, a 4 MB RAM, a 170 MB hard disk drive, and a standard CRT as an optional device and needs software programs 1 and 2 to be installed. Other optional devices include CD-ROMs, speakers, video devices, communication devices, etc. Installation information tables as shown above are transmitted to PC shipping installation system in the manufacturer's plant and dumped therein via telephone line 41 in a batch process every night.

PC shipping installation system is a network system comprising an installation information transmission terminal 32 which receives the installation information tables via telephone line 41, a large number of PCs to be shipped (a maximum number may be 250, for example) 34-1 . . . , 34-n, an installation server 36 made of a larger PC which has the network OS installed therein, and an installation monitor terminal 38 including a monitor 39 (a CRT or printer), all connected with each other through a network 31 (a LAN network).

Installation information tables received by installation information transmission terminal 32 via network 31 is transmitted to a storage device 36a of installation server 36 and stored therein. The hardware configuration information (i.e., assembly information) in the installation information is printed out. Workers at the plant install PC hardware according to the hardware configuration information of printout list 32a. For example, the PC 1234568 is assembled with a board with a standard CPU, an internal 10MB RAM board, a 340 MB hard disk drive, and a high speed CRT. When the assembly is completed, the hardware configuration information is written in the nonvolatile memory in the PC. Thus, the hardware of a PC has been built according to the configuration specified by a buyer. All data for the hardware configuration information are not entered in the fields. The standard data have been written there in advance and only data that are different from the standard ones are entered. PCs 34-1 . . . , 34-n with the appropriate hardware installed and its hardware configuration information written in the memory are connected to network 31 and then software installation is performed on the PCs as described below.

In the present embodiment, each of the nodes of the network is provided with a floppy disk (one of the group of FD-1 . . . , and FD-n) that contains a installation start-up program (i.e., an installer) for that node. Floppy disks FD-1, . . . , FD-n are inserted in the driver of hardware installed PCs 34-1 . . . , 34-n and the installation program is started.

Hardware installed PCs 34-1, . . . , 34-n each have a memory device 35 that comprises a floppy disk drive 35a, a hard disk drive 35b, and an internal memory 35c. The hardware configuration information of the individual PCs is written in the nonvolatile memory region of internal memory 35c. Memory device 35 of hardware installed PCs 34-1, . . . , 34-n further includes communication device 35d coupled to network 31 and a control device 35e described below. Installation server 36 also includes a communication device 36b connected to network 31 and a control device 36c described below. A memory device 36a of installation server 36 stores the installation information transferred from installation information transmission terminal 32, the software information stored in advance (i.e., the operating system software (Software 1), various application software program (Software 1–3), and the information for setting up an environment), and the installation status information that indicates the status of installation while the installation is being carried out.

The installation operation of PC shipping installation system is described with reference to the flow chart shown in FIG. 4. Hardware installed PCs (without a CRT and a keyboard) 34-1, . . . , 34-n are connected to network 31 and the power is switched on. Now installation of PC 34-1 is taken as an example to describe the operation below.

In step a in FIG. 4 installation floppy disk FD-1 is inserted in the drive of hardware installed PC 34-1 to start up the PC. Hardware installed PC 34-1 copies the installation start-up program into its internal memory 35c, which in turn initiates the following processes. First, communication device 35d is connected to installation server 36 via network 31. Next, in step b, the operation determines whether hard disk drive 35b has been initialized. If it has not been initialized, the operation moves to step c, and if it has, to step i. Since in this embodiment we assume the shipment of PCs at a manufacturer's plant, hard disk drive 35b has not been initialized. The operation, therefore, moves to step c in which the bar coded ID 41 (1234568, for example) attached to the PC is read with a bar code reader 40 connected to the PC. In step d, using the just read ID as a key, PC 34-1 retrieves the installation information (Table 1) for that ID (1234568, for example) from the installation information table stored in storage device 36a of installation server 36. In step e, the hardware configuration information stored in the nonvolatile memory region is read. In step f, the operation checks the consistency of the hardware configuration information read from the nonvolatile memory region stet the hardware configuration information within the installation information retrieved from installation server 36. On the one hand, if the operation finds any inconsistency and determines "error," it activates a buzzer installed in the PC and stops the installation operation. The inconsistency means that the hardware configuration the buyer ordered is different from that of the actual hardware installed PC and that there has been an error in either the hardware installation operation or the rewrite process of the hardware configuration information. On the other hand, if the operation does not find inconsistency, it proceeds to step g, wherein hard disk drive 35b is initialized. After completing the initialization, the operation goes to step h in which the PC is reset. After this step the operation goes back to step a to read the installation start-up program from floppy disk 34-1 and connects the PC to installation server 36. In step b, initialization of the hard disk 35c is checked. This time, since the hard disk has already been initialized, the operation continues to step i. In step i, the operating system software program (Software 1) is installed. In other words, based on the installation information, the corresponding software information is read at storage device 36a of installation server 36 to retrieve software 1 and the information for setting up the environment, and then the installation and the environment setting up processes are performed for software 1. In step j, a decision is made as to whether the application software program (Software 2–4) should be installed. If the decision is "yes", the operation moves to step k; if it is "no", the operation continues at step m. In step k, the application software program (Software 2) is installed, and in step 1 the environment of that application software is set up. In other words, based on the installation information, the corresponding software information is read at storage device 36a of installation server 36 to retrieve software 2 and the information for setting up the environment, and then the installation and the environment setting up processes are performed for software 2. In step m, an installation monitor terminal 38 is set to show the completion of the installation of the individual application software. In step n, a decision is made as to whether the installation of all of the software programs (Software 1–4) is completed. On the one hand, if the decision is "no," the operation goes back to step i to install the next application software. On the other hand, if the decision is "yes," the operation goes to step o, where installation monitor terminal 38 is set to show completion of the installation of all the application software programs, and the operation ends after disconnecting installation server 36. The status of the installation operation of Software 1–4is set at installation server 36 and is displayed in real time on a monitor display device 39 by installation monitor terminal 38. Thus, the completion time can be estimated and the next PC to be installed may be ready before the present operation is completed.

In the present embodiment the automatic check on the hardware installation of a PC and the automatic software installation on it are carried out in the shipping operation in order to meet the specifications of a buyer. This streamlines a complicated shipping operation and hence reduces the time required for shipping.

In particular, the operating system is automatically installed after the hard disk drive is initialized, and manual installation operations for the operating system program as well as application software programs are not needed. Therefore, the present system is suitable for PC classes at schools and for the shipping operations of installed PCs.

In PC shipping installation system mentioned above, the installation start-up program (installer) is stored in installation floppy disk FD-1. The installer is started by uninstalled PC 34-1 and copied to the PC. Another configuration of the PC installation system is shown in FIG. 5, which is a block diagram of a part of the system, namely PC 34-1 to be shipped and installation server 36. The ROM of the internal memory of PC 34-1 contains a communication start-up unit 35f which stores the kernel (a program to start-up communication) of the operating system software. Storage device 36a of installation server 36 stores the installation start-up program (installer). When PC 34-1 is switched on, communication start-up unit 35f starts operating and copies, through control device 35e, the kernel of the operating system software program to storage device 35. Then, communication device 35d receives the information for the basic operations, is initialized, and connects PC 34-1 to installation server 36 via network 31. Next, the installation start-up program (installer) stored in storage device 36a of installation server 36 is transferred to PC 34-1 through network 31. The operation after this step is the same as that of the previous embodiment. Thus the installer is read from installation server 36 without manually inserting installation floppy disk FD-1 into the drive and copying it to the PC. Accordingly, all the operations workers have to do for PC installation is switching on the PC and reading its ID with bar code reader 40. If ID information is input at the same time the hardware configuration information is changed on the hardware installation, the bar code reading may not be necessary on the software installation.

While the invention has been described in conjunction with several specific embodiments, it is evident to those skilled in the art that many further alternatives, modifications and variations will be apparent in light of the forgoing description. Thus, the invention described herein is intended to embrace all such alternative, modifications, applications and variations as may fall within the spirit and scope of the appended claims.

What is claimed is:

1. An installation system, comprising:
   an installation server;
   at least one computer terminal; and
   a network connected between said installation server and said at least one computer terminal;
   wherein said installation server comprises storage for storing installation information that includes an ID of said at least one computer terminal and at least one application software program;
   wherein said at least one computer terminal comprises:
   a memory device;
   installation start-up program storage for storing an installation start-up program that is copied from a information recording device when said computer terminal is switched on;
   ID storage for storing said ID of said computer terminal;
   memory device initialization decider for determining whether initialization of said memory device is necessary;
   installation information storage for, if said memory device initialization is necessary, retrieving from said installation server said installation information corresponding to said computer terminal using said computer terminal ID as a key, and said installation information storage storing said installation information;
   memory device initializer for initializing said memory device after said installation information is retrieved from said installation server;
   installation decider for determining whether said at least one application software program should be installed based on said installation information; and
   application software installer for, if said application software program should be installed, installing said application software program based on said installation information after retrieving said application software program from said installation server.

2. An installation system, comprising:
   an installation server;
   at least one computer terminal; and
   a network connected between said installation server and said at least one computer terminal;
   wherein said installation server comprises:
   storage for storing an installation start-up program, installation information that includes an ID of said at least one computer terminal and at least one application software program;
   wherein each computer terminal comprises:
   a memory device;
   start-up communicator for storing at least a communication start-up program and for, when said computer terminal is switched on, copying said installation start-up program from said installation server;
   installation start-up program storage for storing said installation start-up program that is copied from said installation server;
   ID storage for storing said ID of said computer terminal;
   memory device initialization decider for determining whether initialization of said memory device is necessary;
   installation information storage for, if said memory device initialization is necessary, retrieving from said installation server said installation information corresponding to said computer terminal using said computer terminal ID as a key, and said installation information storage for storing said installation information;
   memory device initializer for initializing said memory device after said installation information is retrieved from said installation server;
   installation decider for determining whether said at least one application software program should be installed based on said installation information; and
   application software installer for, if said application software program should be installed, installing said application software program based on said installation information after retrieving said application software program from said installation server.

3. An installation method for a system comprising an installation server, at least one computer terminal, and a network connected between said installation server and said at least one computer terminal, said method comprising:

storing in said installation server installation information that includes an ID of said at least one computer terminal and at least one application software program;

copying an installation start-up program from a portable information recording medium into an installation start-up program storage of said at least one computer terminal when said at least one computer terminal is switched on;

storing said ID of said at least one computer terminal in an ID storage of said at least one computer terminal;

determining whether initialization of a memory device of said at least one computer terminal is necessary;

if initialization of said memory device is necessary, retrieving from said installation server said installation information corresponding to said at least one computer terminal using said computer terminal ID as a key, and storing said installation information in an installation information storage of said at least one computer terminal;

initializing said memory device after said installation information is retrieved from said installation server;

determining whether said at least one application software program should be installed based on said installation information; and if said at least one application software program should be installed, retrieving said application software program from said installation server and installing said application software program based on said installation information.

4. An installation method for a system comprising an installation server, at least one computer terminal, and a network connected between said installation server and said at least one computer terminal, said method comprising:

storing in said installation server an installation start-up program, installation information that includes an ID of said at least one computer terminal and at least one application software program;

storing at least a communication start-up program in a start-up communicator of said at least one computer terminal and copying said installation start-up program from said installation server;

storing said installation start-up program that is copied from said installation server in an installation start-up program storage of said at least one computer terminal;

storing said ID of said at least one computer terminal in an ID storage of said at least one computer terminal;

determining whether initialization of a memory device of said at least one computer terminal is necessary;

if initialization of said memory device is necessary, retrieving from said installation server said installation information corresponding to said at least one computer terminal using said computer terminal ID as a key, and storing said installation information in an installation information storage of said at least one computer terminal;

initializing said memory device after said installation information is retrieved from said installation server;

determining whether said at least one application software program should be installed based on said installation information; and if said at least one application software program should be installed, retrieving said application software program from said installation server and installing said application software program based on said installation information.

* * * * *